UNITED STATES PATENT OFFICE.

SAMUEL LEWIS SUMMERS, OF PHILADELPHIA, PENNSYLVANIA.

BISMUTH OXYIODID METHYLENE DIGALLATE AND PROCESS OF MAKING SAME.

SPECIFICATION forming part of Letters Patent No. 690,672, dated January 7, 1902.

Application filed October 9, 1901. Serial No. 78,082. (No specimens.)

*To all whom it may concern:*

Be it known that I, SAMUEL LEWIS SUMMERS, a citizen of the United States, residing at Philadelphia, in the State of Pennsylvania, have invented a certain new and useful Bismuth Oxyiodid Methylene Digallate and Process of Producing the Same, of which the following is a full, clear, and exact description.

My invention relates to the production of a new methyl digallate of bismuth oxyiodid, having great utility as a pharmaceutical product; and my discovery comprehends the product as a new chemical body, as well as a particular process which I have invented for the production of the same.

Methylene digallate of bismuth has never been heretofore prepared save by the reaction of bismuth hydrate on methylene digallate acid, and this forms a bluish-gray powder of the formula $4C_{15}H_{12}O_{10} + 3BI(OH_2)$ and containing about 28.4 per cent. of bismuth.

I have discovered that oxyiodid of bismuth will react on methylene digallic acid to produce a compound the result of the chemical union of those substances and which is essentially a methylene digallate of the oxyiodid of that metal having the chemical formula $Bi_2I_2C_{15}H_{12}O_{12}$ and which will be more stable and also contain a larger percentage of bismuth—namely, about 39.33 per cent.—than the resultant of the reaction by bismuth hydrate and which possesses medicinal value imparting great utility to it as a pharmaceutical product.

My invention therefore consists in forming a methylene digallate of a bismuth compound—specifically, the oxyiodid—as hereinafter described.

One process by which may be prepared my new product is as follows: A solution is prepared of gallic acid one hundred and seventy parts and formaldehyde thirty parts, and this is caused to react on a compound of bismuth nitrate three hundred and ninety-six parts, iodin one hundred and twenty-seven parts, and potassium iodid one hundred and six parts, which latter in admixture form a solid composition. The solution first named is of course the methylene digallic acid, $(C_{15}H_{12}O_{10},)$ and the composition upon which it is caused to react is bismuth oxyiodid, (BiOI,) either of which, however, may be otherwise prepared than above set forth. Stated in weights in lieu of parts as above given, I form this oxyiodid by compounding nine and five-tenths kilos of crystallized bismuth nitrate with 3.04 kilos of iodin and 2.54 kilos of potassium iodid. The reaction is effected under constant stirring, and the methylene digallic acid is exhibited to the bismuth oxyiodid in a slightly-heated condition, say 90° Fahrenheit. The result of the reaction is a precipitate in the form of an impalpable powder, originally a greenish-black color. It is to be purified by repeated washings until the washings become nearly colorless and the washed product becomes of a reddish-brown color. It is then collected and dried at a temperature not exceeding 60° centigrade, whereupon it becomes of a slightly-lighter brown color, which might be called a "yellowish-red" brown.

Having thus described my invention, what I claim as new, and desire secured by Letters Patent, is—

1. The product described, which is the methylene digallate of bismuth oxyiodid, which in a dry state is an impalpable powder, of a reddish-brown color, contains about 39.33 per cent. of metallic bismuth, and about 24.1 per cent. of iodin, insoluble in water, and in alcohol, decomposes slowly in a moist atmosphere, and has the chemical formula $Bi_2I_2C_{15}H_{12}O_{12}$.

2. The process herein described of producing bismuth oxyiodid methylene digallate, which consists in reacting on bismuth oxyiodid with methylene digallic acid, with constant stirring, and then repeatedly washing the precipitate and evaporating its contained moisture at a temperature not exceeding 60° centigrade.

3. The process herein described of producing bismuth oxyiodid methylene digallate, which consists in reacting on a compound of crystallized bismuth nitrate, iodin and potassium iodid, with methylene digallic acid, with constant stirring, and then repeatedly washing the precipitate and evaporating its contained moisture at a temperature not exceeding 60° centigrade.

In testimony whereof I have hereunto affixed my signature this 8th day of October, A. D. 1901.

SAMUEL LEWIS SUMMERS.

Witnesses:
GEO. W. REED,
H. T. FENTON.